United States Patent [19]
Charvet

[11] Patent Number: 4,794,967
[45] Date of Patent: Jan. 3, 1989

[54] PNEUMATIC TIRE HAVING BEAD RINGS EACH FORMED BY A STACK OF RIBBONS OF CURVED SHAPE

[75] Inventor: Jean L. Charvet, Clermont-Ferrand, France

[73] Assignee: Compagnie Generale des Etablissements Michelin, Clermont-Ferrand, France

[21] Appl. No.: 162,605

[22] Filed: Mar. 1, 1988

[30] Foreign Application Priority Data

Mar. 12, 1987 [FR] France ................... 87 03526

[51] Int. Cl.⁴ .............................. B60C 15/04
[52] U.S. Cl. ...................... 152/539; 152/540; 152/544; 245/1.5
[58] Field of Search ............. 152/539, 540, 544; 245/1.5

[56] References Cited

U.S. PATENT DOCUMENTS 1,503,883  8/1924  Cobb .
4,321,957  3/1982  Hahn ........................ 152/391 X

FOREIGN PATENT DOCUMENTS 1042861  9/1966  United Kingdom ............ 152/540
1059821  2/1967  United Kingdom ............ 152/540

Primary Examiner—Michael W. Ball
Assistant Examiner—Jeff H. Aftergut
Attorney, Agent, or Firm—Brumbaugh, Graves, Donohue & Raymond

[57] ABSTRACT

A pneumatic tire has beads each of which is reinforced by a bead ring formed of a stack of ribbons of curved shape. The bead ring is characterized by the following features when the tire is mounted on its rim:

(a) the concavity of the ribbons faces the axis of rotation of the tire;

(b) a straight line connecting the ends of any ribbon forms with the axis of rotation of the tire an acute angle $\alpha$ such that $\alpha \geq \beta + 5$ if $\beta$ is positive and $\alpha \geq 5$ if $\beta$ is negative, $\beta$ being the angle of the bead seat of the rim, $\alpha$ and $\beta$ being expressed in degrees.

3 Claims, 1 Drawing Sheet

PNEUMATIC TIRE HAVING BEAD RINGS EACH FORMED BY A STACK OF RIBBONS OF CURVED SHAPE

BACKGROUND OF THE INVENTION

The present invention concerns pneumatic tires and, more particularly, tee reinforcement of the beads of such tires. In order to reinforce the beads of pneumatic tires it is known to use bead rings which are formed of a stack of ribbons of curved shape, these bead rings being referred to below as "tiled bead rings." Tiled bead rings are described, for instance, in the following patents or patent applications: U.S. Pat. Nos. 1,503,883; 1,527,700; FR Nos. 698,304; 1,363,074; 2,466,357; Japanese patent application filed after examination under No. JP 52-1524.

These bead rings usually are made by simply winding a ribbon of curved shape resulting in an imbrication which stabilizes the turns with respect to each other, which limits the number of clamping collars so that these bead rings are very economical to produce.

Tires reinforced with such tiled bead rings are at times intended for mounting on rims which have circumferential bosses serving as stops, such a boss being also referred to as a "hump" in the tire industry. When the tires with tiled bead rings are mounted on these rims, each bead is arranged between a hump and a rim flange and experience shows that these tires then have the following drawbacks:

difficult mounting and dismounting;

rapid unwedging of a flat tire upon travel, the bead of the tire then easily moving over the hump and positioning itself in the well of the rim, which results in serious problems of safety.

SUMMARY OF THE INVENTION

The object of the invention is to avoid these drawbacks

Accordingly, the invention concerns a pneumatic tire mountable on a rim, the tire having beads each of which is reinforced by at least one bead ring formed of a stack of ribbons of curved shape, the bead ring being characterized by the following features when the tire is mounted on the rim:

(a) the concavity of the ribbons face the axis of rotation of the tire;

(b) in radial section, a straight line connecting the ends of any ribbon forms with the axis of rotation of the tire an acute angle $\alpha$ such that $\alpha \geq \beta + 5$ if $\beta$ is positive and $\alpha \geq 5$ if $\beta$ is negative, $\beta$ being the angle of the bead seat of the rim, $\alpha$ and $\beta$ being expressed in degrees, the end of the ribbon arranged towards the inside of the tire being closer to the axis of rotation of the tire than the end of the ribbon arranged towards the outside of the tire.

The invention will be readily understood by means of the nonlimitative examples which follow and the figures, all schematic, covering these examples:

DETAILED DESCRIPTION OF THE INVENTION

Figure 1:
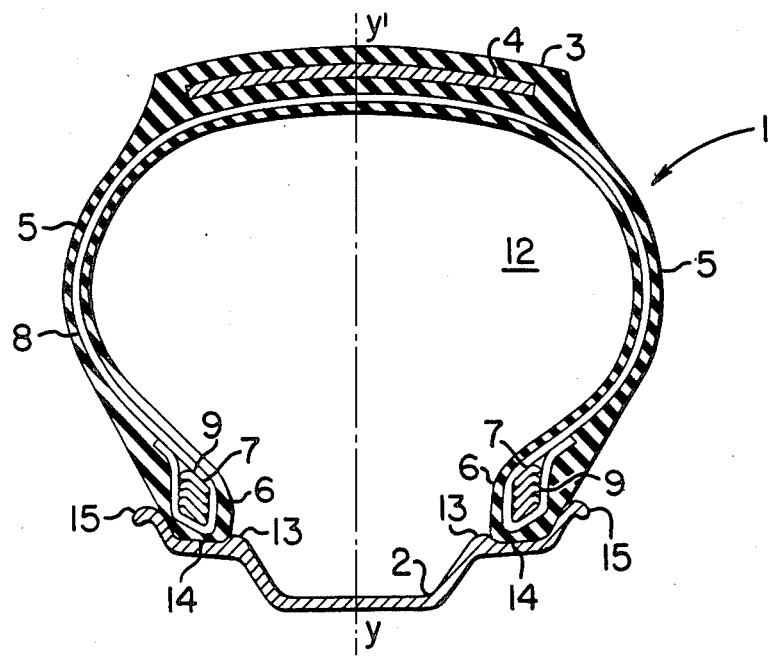
FIG. 1 is a radial section through a pneumatic tire according to the invention, having two beads.

FIG. 1 shows, in radial section, a pneumatic tire 1 according to the invention mounted on a known rim 2. The tire 1 has a crown 3, reinforced in known manner by a reinforcement 4, two sidewalls 5 and two beads 6. Each bead 6 is reinforced by a bead ring 7. A carcass ply 8 extends from one bead 6 to the other, being wound around each bead ring 7 so as to obtain an anchoring.

Figure 2:
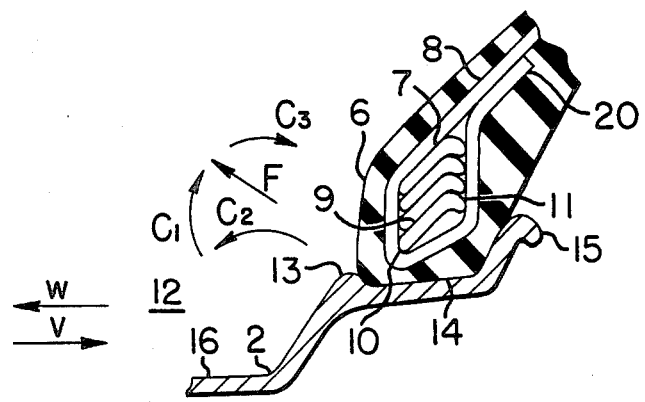
FIG. 2 is a radial section through a bead of the tire shown in FIG. 1, this bead having a bead ring formed of a stack of ribbons of curved shape.

A bead 6 is shown in greater detail in radial section in FIG. 2 together with the portion of the rim 2 corresponding to this bead 6. The bead ring 7 is a so-called "tiled bead ring" formed of a stack of ribbons 9 of curved shape, this stack being obtained, for example, by winding several turns of continuous ribbon of curved shape, each ribbon 9 then corresponding to one turn. These ribbons 9 are embedded one within the other. One of these ribbons 9 is shown in greater detail in radial section in FIG. 3. The concavity of the ribbons 9 faces the axis of rotation of the tire 1, this axis being represented by the line xx' in FIG. 3.

Figure 3:
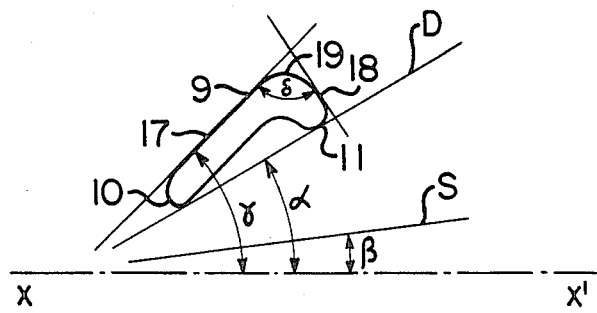
FIG. 3 is a radial section through a ribbon of curved shape of the bead ring shown in FIG. 2.

In radial section, each ribbon 9 has two ends 10 and 11, one end 10 being arranged towards the inside of the tire 1, that is to say towards the cavity 12 defined by the tire 1 and the rim 2, and one end 11 being arranged towards the outside of the tire 1. For simplicity of the drawing, the ends 10 and 11 are indicated only in the case of one ribbon 9 in FIG. 2. In FIG. 3 a straight line D tangent to the ends 10 and 11 of the ribbon 9 is shown. This line D forms an acute angle $\alpha$ with the axis xx'. The inner end 10 is closer to the axis xx' than the outer end 11, that is to say the angle $\alpha$ opens towards the outside of the tire 1 when moving from the end 10 towards the end 11.

The tire 1 and the rim 2 have the same equatorial plane perpendicular to the axis xx', this equatorial plane being represented by the line yy' in FIG. 1. On each side of the equatorial plane yy' the rim 2 has, alongside the tire 1, a circumferential hump 13 serving as a stop, a bead seat 14 and a rim flange 15. Each bead 6 is arranged between a hump 13 and a rim flange 15 and rests on the rim 2, adapting itself to the surface of the bead seat 14. In radial section, this surface of the bead seat 14 is a straight line, such a line S being shown in FIG. 3 for the bead seat 14 corresponding to the ribbon 9 of that figure. The line S forms an angle $\beta$, called the "seat angle," with the axis xx'. The angle $\beta$ is termed positive if the bead seat 14 moves away from the axis xx' when one moves away from the equatorial plane yy' and conversely the angle $\beta$ is termed negative if the bead seat 14 approaches the axis xx' when moving away from the equatorial plane yy'. The angle $\beta$ shown in FIGS. 1 to 3 is positive. In accordance with the invention, $\alpha \geq \beta + 5$ if $\beta$ is positive and $\alpha \geq 5$ if $\beta$ is negative, $\alpha$ and $\beta$ being expressed in degrees.

The tire 1 has the following advantages, due to the arrangement of the above-described bead ring 7:

During the mounting of the tire 1, the bead 6 moves in the direction of the arrow V so as to pass over the hump 13 and to place itself on the surface of the bead seat 14; upon this operation, the outer end 11 of the ribbon 9 first of all easily clears the hump 13 due to the angle $\alpha$; the inner end 10 of the ribbon 9 then arrives in the vicinity of the hump 13 which it, in its turn, clears, due to a rotation of the bead ring 7 on itself; this rotation corresponds to a movement of the inner end 10 away from the axis xx'; this rotation, which is indicated schematically by the arrow $C_1$ in FIG. 2, is made easy since the outer end 11 has the possibility of moving closer to the axis xx'. This permits the bead 6 to assume easily its place upon mounting between the hump 13 and the rim flange 15.

Upon dismounting, a dismounting tool is applied between the bead 6 and the rim flange 15, this tool not being shown in the drawing for purposes of simplification. By pushing on this dismounting tool, a force is exerted which is indicated schematically by the arrow F in FIG. 2. The bead ring 7 offers only slight resistance to this force F, so that the bead 6 easily clears the hump 13, moving towards the equatorial plane yy', that is to say the dismounting is easy since there is no rotation of the bead ring 7 on itself, but a slight increase in its development due to its elasticity, as in the case of a conventional bead ring.

On cornering, if the pressure of the tire is abnormally low, for instance as the result of a puncture, the drift thrust due to the cornering exerts a tilting torque on the bead 6 which is located towards the outside of the turn, which torque is represented by the arrow $C_2$ in FIG. 2. This torque $C_2$ tends to cause the bead 6 to move over the hump 13 in the direction indicated by the arrow W. When the bead 6 thus penetrates into the rim well 16 there is a loss of control of the vehicle. Due to the invention, the bead ring 7 causes the formation of an opposing torque, indicated schematically by the arrow $C_3$ in FIG. 2. This torque $C_3$ is due to the fact that the inner ends 10 apply themselves against the bead seat 14 and cause a locking of the bead 6. This torque $C_3$ opposes the torque $C_2$, that is to say this resistant torque $C_3$ plays a role which avoids the unwedging of the tire 1.

It is surprising to note that the tire 1 of the invention makes it possible to fulfill two opposite functions: On the one hand, it permits rapid mounting and dismounting on the rim 2 and, on the other hand, it makes unwedging difficult upon a sudden drop in pressure upon travel, which makes the tire 1 safer.

The expression "ribbon of curved shape" is very general and covers, for instance, embodiments in which, in radial section, the ribbons 9 have a curvature which is distributed over a large part or all of said section, as well as embodiments in which the radial section has two practically rectilinear parts forming an angle with each other the curvature being then located at the place where these parts join.

This curved shape is preferably obtained by folding a strip of rectilinear transverse cross section, but one can contemplate other embodiments, the curved shape being obtained for instance upon rolling. The ribbon 9 shown in FIG. 3 has, for instance, two practically rectilinear parts 17, 18 connected by a localized curved part 19. The inner rectilinear part 17 forms the angle $\gamma$ with the axis xx'. The angle $\gamma$ is located on the same side of the axis xx' as the angle $\alpha$, that is to say the part 17 moves away from the axis xx' when one moves away from the equatorial plane yy', and the angle $\gamma$ is greater than the angle $\alpha$.

The part 18 constitutes the outer part of the ribbon 9 and it terminates with the outer end 11, the inner part 17 terminating with the inner end 10. The parts 17, 18 define the angle $\delta$, this angle $\delta$ being directed towards or facing the axis xx' since it corresponds to the concavity of the ribbon 9.

By way of example, the ribbon 9 shown in FIG. 3 has, in radial section, an asymmetric shape, the inner part 17 being longer than the outer part 18.

It is possible to select the angles $\gamma$ and $\delta$ in such a manner that the invention has the following additional advantages;

the angle $\gamma$ can be selected so that the inner part 17 of the ribbon 9 furthest away from the axis xx' is practically tangent to the equilibrium curve of the carcass ply 8 in the vicinity of the bead ring 7 or practically parallel to the tangent to said equilibrium curve in this vicinity, which permits the carcass ply 8 to apply itself over a large portion of the part 17 and therefore to assure a good continuity of the profile of the carcass ply 8;

the angle $\delta$ can be selected in such a manner that each turned over end 20 of carcass ply 8 applies itself onto the carcass ply 8 without it being necessary to provide a rubber padding between the carcass ply 8 and each turn-over 20, the carcass ply 8 and this turn-over 20 thus closely surrounding the corresponding bead ring 7. Contact between the carcass ply 8 and the bead ring 7 can take place directly or via a layer of rubber.

Of course the invention is not limited to the embodiments which have been described above. Thus, for instance, the tire in accordance with the invention may have several carcass plies and each bead may have several bead rings.

What is claimed is:

1. A pneumatic tire mountable on a rim, the tire having beads each of which is reinforced b at least one bead ring formed of a stack of ribbons of curved shape, the bead ring being characterized by the following features when the tire is mounted on the rim:
   (a) the concavity of the ribbons faces the axis of rotation of the tire;
   (b) in radial section, a straight line connecting the ends of any and all ribbon forms with the axis of rotation of the tire an acute angle $\alpha$ such that $\alpha \geq \beta + 5$ if $\beta$ is positive and $\alpha \geq 5$ if $\beta$ is negative, $\beta$ being the angle of the bead seat of the rim, $\alpha$ and $\beta$ being expressed in degrees, the end of the ribbon arranged towards the inside of the tire being closer to the axis of rotation of the tire than the end of the ribbon arranged towards the outside of the tire.

2. A pneumatic tire according to claim 1, having at least one carcass ply extending from one bead to the other and winding around the bead rings, characterized by the fact that the inner part of the ribbon which is furthest away from the axis of rotation of the tire is practically tangent to the equilibrium curve of the carcass ply in the vicinity of the bead ring, or practically parallel to the tangent to this equilibrium curve in this vicinity, the carcass ply applying itself against a large portion of said inner part.

3. A pneumatic tire according to claim 1 or 2, having at least one carcass ply extending from one bead to the other and winding around the bead rings so as to form carcass turn-overs, characterized by the fact that each turn-over applies itself against the carcass ply without there being any rubber padding between the carcass ply and each of the turn-overs.

* * * * *